United States Patent

[11] 3,622,595

[72] Inventor Enzo Marchetti
     Rome, Italy
[21] Appl. No. 794,788
[22] Filed Jan. 28, 1969
[45] Patented Nov. 23, 1971
[73] Assignee Instituto Farmacologico Serono S.p.A.
     Rome, Italy
[32] Priority Jan. 31, 1968
[33] Italy
[31] 12243 A/68

[54] OXAZOLE N-AMIDINO-CARBOXYAMIDES WITH NATRIURETIC ACTION
     4 Claims, No Drawings
[52] U.S. Cl.................................................. 260/307 R, 424/272
[51] Int. Cl......................................................... C07d 85/44
[50] Field of Search........................................... 260/307

[56] References Cited
OTHER REFERENCES

Theilheimer—" Synthetic Methods of Organic Chemistry" Vol. 9, p. 186, No. 439–Interscience (1955)

Primary Examiner—Alex Mazel
Assistant Examiner—R. V. Rush
Attorney—Ostrolenk, Faber, Gerb & Soffen ABSTRACT: The invention relates to the synthesis and the pharmacological activity, particularly the natriuretic activity, of novel acyl-guanidine compounds. The new compounds are of the formula

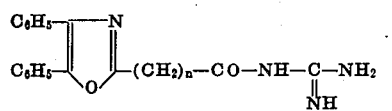

wherein $n$ represents the numbers 0, 1 or 2.

OXAZOLE N-AMIDINO-CARBOXYAMIDES WITH NATRIURETIC ACTION

The present invention concerns the synthesis and the pharmacological activity of new acyl-guanidines of the general formula (I) which are derived from oxazole-carboxylic acids of the general formula (II), and particularly of N-amidino-carboxyamides (Ia), (Ib), (Ic), which are derived from 4,5-diphenyl-2-oxazolyl-carboxylic-(IIa), -acetic (IIb) and -3-propionic (IIC) acids, respectively.

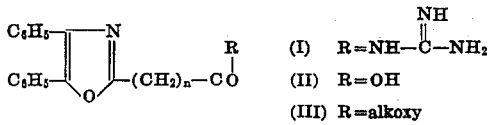

(Ia), (IIa), (IIIa): $n=0$ (Ib), (IIb), (IIIb): $n=1$ (Ic), (IIc), (IIIc): $n=2$

The novel N-amidino-carboxyamides of the present invention are endowed by themselves with poor diuretic properties, however, when administered to test animals together with known diuretic products as chlorotiazide, dihydrochlorotiazide, acetazole-amide, furosemide, etc., the carboxyamides greatly strengthen the diuretic and natriuretic activity thereof, while significantly depressing the removal of potassium ions.

Particularly in the rat, the simultaneous per os administration of 20 mg./kg. hydrochlorotiazide and 100 mg./kg. of N-amidino-carboxyamide (Ia) causes a removal of water and sodium ions nearly double in comparison with animals treated with only the same dosage of hydrochlorotiazide, while the concentration of potassium ions in the urine of animals treated with the above cited association is substantially of the same order as the urine of untreated control animals.

A particular property of the novel guanidine derivatives (I) is the very poor acute toxicity thereof (in the order of 2000–3000 mg./kg. "per os" in the rat and mouse, respectively).

The pharmacological properties of N-amidino-carboxyamides (I) allows utilization in association with substances of high diuretic activity in human therapy, while removing or compensating the undesirable, excessive excretion of potassium ions which is generally caused by the administration of a number of diuretic agents.

The above-mentioned associations may be, in particular, useful in the treatment of afflictions deriving from an increase or decrease of the concentration of electrolytes in the organism, in arterious hypertension, as well as in all of the pathological afflictions of the oedema type.

Acyl-guanidines or N-amidino-carboxyamides (I) have been prepared according to known processes, such as the action of guanidine on suitable esters of the acids (II) (either in the presence or in the absence of a suitable solvent), or by converting said acids to the corresponding chlorides (for instance through the action of thionyl chloride); said acyl chlorides have been reacted (without previous isolation) with guanidine itself in a suitable solvent (dioxane, dimethylsulfoxide).

The esters of the acids (II) have been obtained by reacting desylamine hydrochloride with (methyl or ethyl) monoester monochlorides of suitable dicarboxylic acids, particularly of oxalic, malonic, succinic acids; the so obtained corresponding substituted amides (IV), upon warming with condensing agents in a suitable solvent (benzene, xylene) afford the esters (III). Among the above-mentioned intermediates only the ester (IIIa, $R=OC_2H_5$) and the amide (IVa, $R=C_2H_5$) have been already described in the literature.

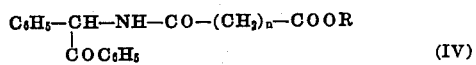

(IVa)     $n=0$ — R=alkyl (IVb)     $n=1$ — " "

(IVc)     $n=2$ — " "

Alkaline hydrolysis of esters (IIIb) and (IIIc) has allowed the corresponding acids (IIb, and (IIc) to be prepared, however, in the case of esters (IIIa), hydrolysis results in the simultaneous opening of the heterocyclic ring and does not allow the acid (IIa) to be obtained.

The following examples illustrate briefly the methods employed for synthesizing acyl-guanidines (I).

EXAMPLE 1

One mole desylamine hydrochloride (or free base) is suspended (or dissolved) in a suitable anhydrous solvent (for instance benzene, toluene, xylene, etc.) and the suspension under stirring is warmed with 1 mole of an alkoxy-oxalylchloride, an alkoxy-malonylchloride or an alkoxy-succinylchloride, respectively, while prosecuting heating until HCl release ends.

The reaction may be carried out also by starting with desylamine hydrochloride or free base; in the presence of a substance of a basic nature (i.e. triethylamine, pyridine, etc.) which is capable of blocking the acidity which develops in the reaction.

Upon the reaction completion, crystallization of the amides (IV) is obtained by cooling, for example: N(methoxalyl)-desylamine (IVa, $R=CH_3$; m.p. 158° C.), N-(ethoxymalonyl)-desylamine (IVb, $R=C_2H_5$; m.p. 89°–90° C.), N-(methoxysuccinyl)-desylamine (IVc; $R=CH_3$; m.p. 103°–104° C.).

Cyclization of the amides (IV) to the corresponding esters of 4,5-diphenyl-2-oxazolyl-carboxylic, -acetic and -3-propionic acids, respectively, is attained by the action of phosphorus oxychloride, in the warm, in suitable anhydrous solvents (i.e. benzene, toluene, xylene), or by utilizing the condensation agent itself as the solvent means.

The esters (III) are obtained from the reaction mixture by removing the solvent, treating with icewater, extracting with a suitable solvent (ether, chloroform, etc.) and crystallizing from an appropriate solvent (i.e. diluted ethyl alcohol) the residue obtained by extraction solvent evaporation. For example the following esters are obtained: 4,5-diphenyl-2-carbomethoxy-oxazole (IIIa, $R=CH_3$; m.p. 118° C.); 4,5-diphenyl-2-carbethoxymethyl-oxazone (IIIb, $R=C_2H_5$; m.p. 67°–69° C.); 4,5-diphenyl-2(2-carbomethoxy-ethyl)-oxazole (IIIc, $R=CH_3$; m.p. 58°–59° C.).

The esters (III) in solution in a suitable solvent (i.e. methanol, dioxane, etc.) are reacted with guanidine base (from 2 to 5 moles) at temperatures in the range from 20° to 80° C.; upon reaction completion the product precipitation is completed by dilution with water, whereafter the acyl-guanidines are filtered, washed with water and then crystallized from an appropriate solvent (dimethylformamide, dimethylsulfoxide, diluted alcohol, etc.). N-amidino-carboxyamides of 4,5-diphenyl-2-oxazolyl-carboxylic (Ia, m.p. 245°–247° C.), -acetic (Ib, m.p. 202° C.), -3-propionic acids (Ic, m.p. 160° C.) are so obtained.

EXAMPLE 2

The esters (IIIb) and (IIIc) are saponified by treating them with alkaline hydroxides in a hydroalcoholic solution, at a temperature comprised between 20° and 80° C.; by acidification and subsequent crystallization from diluted alcohol, 4,5-diphenyl-2-oxazolyl-acetic acid (IIb, m.p. 117°–8° C.) and (4,5-diphenyl-2-oxazolyl)-3-propionic acid (IIc, m.p. 160°–161° C.), are obtained respectively.

Acyl chlorides which are obtained from said acids by treatment with $SOCl_2$, allow N-amidino-carboxyamides (I) to be prepared by subsequent reaction with guanidine.

The embodiments of the invention in which an exclusive privilege or property is claimed are defined as follows:

1. An oxazole N-amidino-carboxyamide of the formula

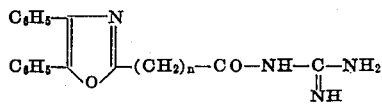

wherein $n$ represents the numbers 0, 1 or 2.

2. The compound of claim 1, wherein said carboxyamide is the N-amidino-carboxyamide of 4,5-diphenyl-2-oxazolylcarboxylic acid.

3. The compound of claim 1, wherein said carboxyamide is the N-amidino-carboxyamide of 4,5-diphenyl-2-oxazolylacetic acid.

4. The compound of claim 1, wherein said carboxyamide is the N-amidino-carboxyamide of (4,5-diphenyl-2-oxazolyl)-3-propionic acid.

* * * * *